United States Patent [19]

Tobita et al.

[11] 3,945,552

[45] Mar. 23, 1976

[54] METHOD AND APPARATUS FOR FORMING A CORRUGATED WAVEGUIDE

[75] Inventors: Susumu Tobita, Ichihara; Masashi Shimoishizaka, Yokohama; Yuzo Sumita, Ichihara; Isamu Oishi, Yokohama; Koji Kato, Ichihara, all of Japan

[73] Assignee: Furukawa Electric Co., Ltd., Tokyo, Japan

[22] Filed: Dec. 9, 1974

[21] Appl. No.: 531,225

[52] U.S. Cl. .................. 228/17.5; 72/184; 72/360; 72/367

[51] Int. Cl.$^2$ .......................................... B23K 1/20

[58] Field of Search ....... 72/76, 176, 177, 184, 187, 72/360, 367, 398; 29/600; 228/17.5, 18

[56] References Cited

UNITED STATES PATENTS

| | | | |
|---|---|---|---|
| 2,178,141 | 10/1939 | Frame | 72/367 |
| 2,419,678 | 4/1947 | Duenas et al. | 72/76 |
| 3,296,852 | 1/1967 | Fuchs et al. | 72/398 |
| 3,546,916 | 12/1970 | Maeda et al. | 72/256 |
| 3,772,772 | 11/1973 | Lehnert | 29/600 |

FOREIGN PATENTS OR APPLICATIONS

| | | | |
|---|---|---|---|
| 1,099,139 | 1/1968 | United Kingdom | 72/184 |
| 894,860 | 10/1953 | Germany | 72/176 |

*Primary Examiner*—Lowell A. Larson
*Attorney, Agent, or Firm*—George B. Oujevolk

[57] ABSTRACT

A method and apparatus for forming a corrugated waveguide which has pairs of sub-blocks for forming the corrugated metal tube into the desired shape repeatedly by mating the sub-blocks, separating and advancing them intermittently so that the desired elliptic section or predetermined shape of section of the corrugated tube may be gradually approximated.

8 Claims, 64 Drawing Figures

METHOD AND APPARATUS FOR FORMING A CORRUGATED WAVEGUIDE

BACKGROUND OF THE INVENTION

This invention relates to a method and apparatus for forming a corrugated waveguide from a cross-sectional shaped tube into a desired shape such as elliptical or rectangular shape in cross-section having longitudinal uniformity.

SUMMARY OF THE INVENTION

It is, an object of the present invention to provide a method of forming a corrugated waveguide which eliminates the disadvantages of the conventional method of forming the corrugated waveguide and forms a corrugated waveguide having good electric characterisitics.

It is another object of the present invention to provide an apparatus for forming a corrugated waveguide which performs the foregoing method.

DETAILED DESCRIPTION

Figure 1A:
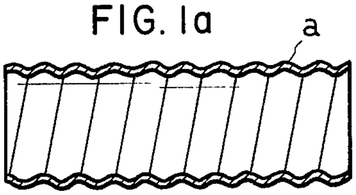
FIGS. 1(*a*) and 1(*b*) are longitudinal sectional views of various corrugated waveguide.
Figure 1B:
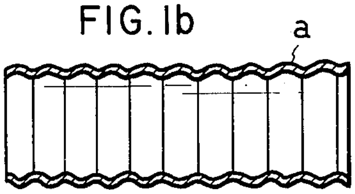
Figure 2C:
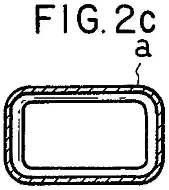
FIGS. 2(*b*) to 2(*e*) are lateral sectional views of various waveguides, and FIG. 2(*a*) is a lateral sectional view of a waveguide before being formed as the waveguide shown in FIGS. 2(*b*) to 2(*e*)
Figure 2B:
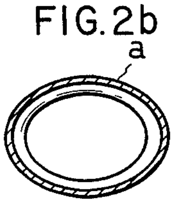
Figure 2A:
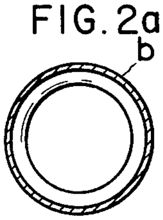
Figure 2D:
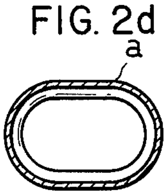
Figure 2E:
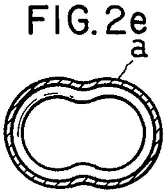
Figure 3A:
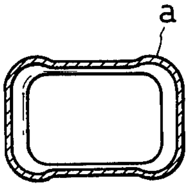
FIGS. 3(*a*) and 4(*a*) are lateral sectional views of other types of waveguides, and FIGS. 3(*b*) and 4(*b*) are lateral sectional views of the waveguides before being formed as the waveguides shown in FIGS. 3(*a*) and 4(*b*)
Figure 3B:
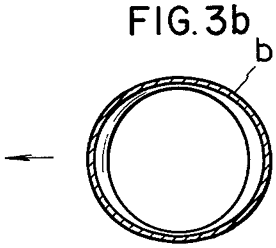
Figure 4A:
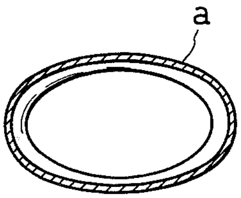
Figure 4B:
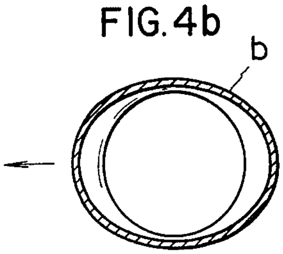
Figure 5A:
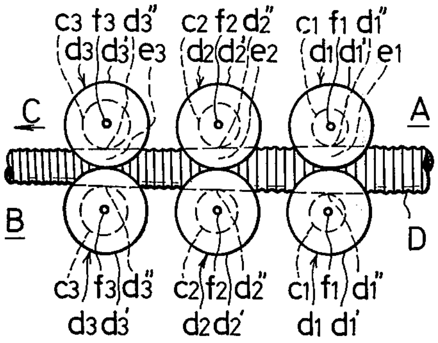
FIG. 5(*a*) is a side view of of the conventional apparatus for forming an elliptic waveguide, and FIG. 5(*b*) is a front view of roller groups forming the apparatus.
Figure 5B:
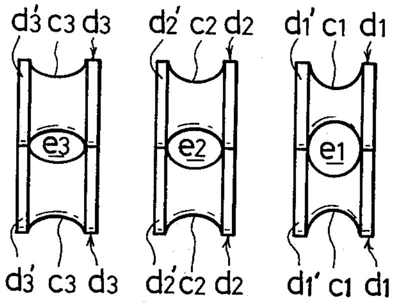

Generally, there are corrugated waveguides formed in spiral shape, as shown in FIG. 1(*a*), formed in bellow type, as shown in FIG. 1(*b*), and as shown in FIGS. 2(*b*) to 2(*e*), their sections may be elliptical, rectangular, flat elliptic, cocoon shape or, as shown in FIG. 3(*a*), center-recessed rectangular shape, or as shown in FIG. 4(*a*), flat elliptic shape having a small corrugated height at the center thereof, but as shown in FIG. 2(*a*), FIGS. 3(*b*) and 4(*b*), the corrugated metal tube *b* formed generally in circular shape in the inner diameter and corrugated peripherally is deformed by forming apparatus rollers as shown in FIGS. 5(*a*) and 5(*b*) and 6(*a*) and 6(*b*). However, the forming apparatus shown in FIG. 5(*a*) and 5(*b*) have pairs of several squeeze rollers *d*1*d*1, *d*2 *d*2, *d*3 *d*3, ... each having different curvature of recesses *c*1, *c*2, *c*3, ... so disposed that the peripheral edges *d*1' *d*1', *d*2' *d*2', *d*3' *d*3'... are contacted in elevation in an opposing manner, and passages *e*1, *e*2, *e*3, ... formed by the recesses *c*1, *c*2, *c*3, ... are generally semi-circular in cross-section at the inlet side A, changing gradually towards the desired shape such as elliptical at the outlet side B in one straight line, and accordingly a generally circular corrugated metal tube D advances in the direction of the arrow C in the passages *e*1, 32, *e*3, ... is contacted at several points with the rollers *d*1 *d*1, *d*2 *d*2, *d*3, *d*3 ... at the upper and lower contacting portions *d*1' *d*1', *d*2' *d*2', *d*3' *d*3'...... and therefore, the load applied to the metal tube D is applied to the contacting portions *d*1' *d*1', *d*2' *d* 2', *d*3' *d*3',...with the result that the upper and lower ends of the metal tube D are pressed locally so that the corrugated portions are strained so as to lose the longitudinal uniformity of the tubes.

Such non-uniformity of the tube takes place particularly when the metal tube D is thin and in the case of a thick tube having a diameter exceeding 100 mm, such as an elliptic waveguide used for a relatively low frequency, the diameters of the rollers *d*1 *d*1, *d*2 *d*2, *d*3 *d*3,... are naturally large, and accordingly more difficult to operate when the metal tube is replaced with another metal tube having a different size, and also the cost of the product become high so as to lose its economy, Further, since the rollers rotate around stationary shafts *f*1, *f*2, *f*3,... through bearings (not shown) similar to the general rollers, if the centering is not proper, they rotate eccentrically so that the corrugated metal tube D is not uniformly formed in shape over the entire length, and therefore its electric characteristics become bad. If, in order to prevent this, the roller and centering are done with high accuracy, it becomes hard to operate the rollers and difficulties are introduced.

Figure 6A:
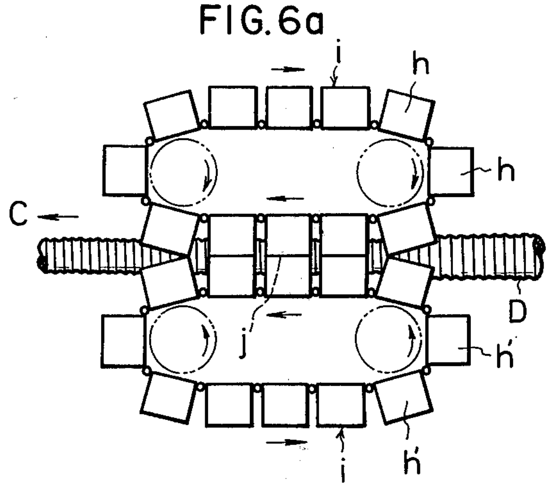
FIG. 6(*a*) is a side view of another type of apparatus, and FIG. 6(*b*) is a front view of mated sub-blocks of the apparatus.
Figure 6B:
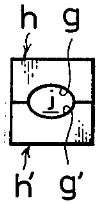

The forming apparatus shown in FIG. 6 has many split sub-blocks *hh*....,*h' h'*... each having recesses *g*, *g'*... formed in desired semi-shape and arranged in pairs along caterpillars *i*, *i'* elevationally in a manner that elliptic passage *j* is formed to advance in a direction of arrow C with the corrugated metal tube D by the opposing recesses *g*, *g'* of the sub-blocks, and therefore, if there exists an irregularity in the shape of the recesses *g*, *g'*, some variation of shape occurs in response to the rotating period of the sub-blocks *hh*,...., *h'*, *h'*...at the metal tube D, and therefore it becomes difficult to obtain desired electric characteristics, and in case of a large type of waveguide using a low frequency band, the respective sub-blocks must be made large, and therefore its operability becomes worse as its disadvantage.

Figure 7C:
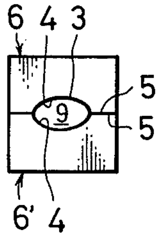
FIG. 7(*a*) is a longitudinal sectional side view of the operating state of the apparatus for forming a generally circular metal tube to a desired shape according to the present invention, and FIGS. 7(*b*) and 7(*c*) are right and left end views of the apparatus shown in FIG. 7(*a*)
Figure 7A:
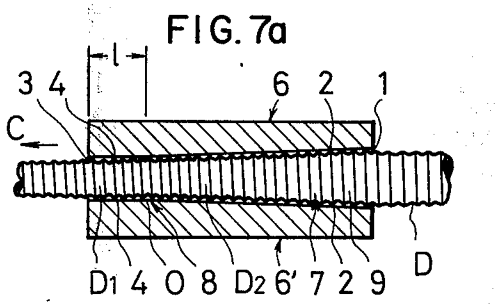
Figure 7B:
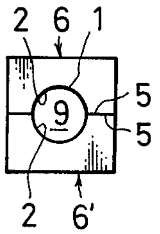
Figure 8A:
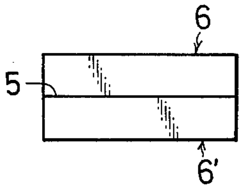
FIGS. 8(*a*) to 8(*c*) are side explanatory views of the operating state of the apparatus.
Figure 8B:
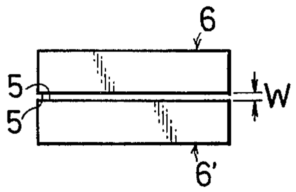
Figure 8C:
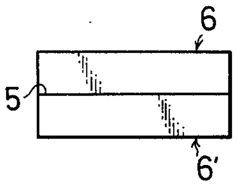

As shown in FIGS. 7(*a*) to 7(*c*), split mold sub-blocks 6 and 6' possess tapered recess portions 2 semi-circular in section at the inlet side 1, uniform recess portions 4 semi-circular in section at the outlet side 3, and mating surfaces 5 longitudinally provided. A corrugated metal tube D generally circular in section is inserted between sub-blocks 6 and 6'. As shown in FIG. 7(*a*) to 7(*c*) and FIG. 8(*a*), the sub-blocks 6 and 6' are mated together at the mating surfaces 5. Thus the tapered recesses 2 and 2 of the sub-blocks 6 and 6' form a tapered passage 7, which presses and deformes the inserted portion of the corrugated metal tube D. Then, the sub-blocks 6 and 6' are separated by a distance of w as shown in FIG.8(*b*). In this state, the corrugated metal tube is advanced towards the outlet side 3 ( in the direction of C as shown in FIG. 7 (*a*) by a predetermined stroke. Then the sub-blocks 6 and 6' are mated together again as shown in FIG. 8(*c*). The above-mentioned series of the mating and separating operations of the sub-blocks 6 and 6' and the advancing operation of the metal tube D are repeated. By the above-mentioned repetition of operations, the corrugated tube D is pressed and deformed by the tapered passage 7 intermittently so that the desired elliptic section of the corrugated tube D may be approximated gradually. Then the corrugated tube D is formed into the desired elliptic shape in section by a uniform passage 8 formed by the uniform recesses 4 when the sub-blocks 6 and 6' are mated. Then the portion $D_1$ having the desired elliptic shape in section is guided out from the uniform passage 8 as the corrugated tube D is advanced. In this case, the advance stroke E (FIGS. 18 and 19) of the corrugated tube D is selected to be equal to or less than the length *l* of the uniform passage 8 so that the corrugated tube may be pulled out with the rear end $D_2$ of the portion $D_1$ remaining slightly inside the uniform passage 8.

In the drawings, the numeral 9 designates a passage formed by the tapered passage 7 and the uniform passage 8. In the embodiments shown in the drawings, the tapered recesses 2 of the sub-blocks 6 and 6' are flattened in section gradually from the inlet side 1 to the tube-advancing direction to become semi-elliptic in section, and these tapered recesses 2 are smoothly connected at the connecting portion 0 to the uniform recesses 4 having a length of *l* thereby forming the passage 9.

Figure 9C:
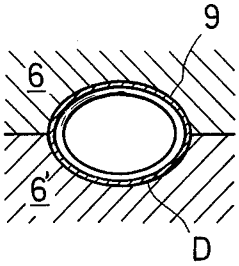
FIGS. 9(*a*) to 9(*c*) are lateral sectional views of the various strokes of the shape of the passage of the apparatus.
Figure 9B:
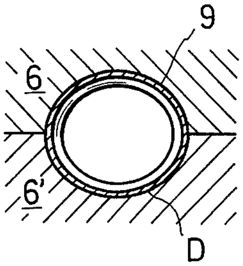
Figure 9A:
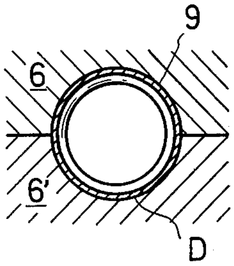

The sub-blocks 6 and 6', whose tapered recesses 2 and uniform recesses 4 are arranged to be opposite to each other, are also arranged to periodically abut against and separate from each other by a suitable mechanism (not shown) as shown in FIG.8. As shown, the separating distance is *w*. In addition, the tapered passage 7 formed when the sub-blocks 6 and 6' abut against each other has at its inlet 1 a diameter slightly larger than that of the corrugated metal tube D and generally circular in cross-section so that the tube D may be easily introduced thereinto. As shown in FIGS. 9(*a*), (*b*) and (*c*), the sectional shape of the passage 7 is preferably formed so that the internal circumference thereof may have the same length as that of the corresponding outer circumference of the corrugated metal tube D at any section from the inlet 1 to the outlet 3 and, in addition, so that the it may gradually changed to reach a desired shape such as ellipse or rectangle at the uniform passage 8. However, in cases where such a construction is impossible to produce, the internal circumference length of the tapered passage 7 may be made slightly larger than the external circumference length of the corrugated metal tube D and only the internal circumference may be made to be the desired forming shape.

In special cases, the sectional shape of the passage 7 may be gradually changed from the inlet 1 to the outlet 3 to finially reach the desired forming shape and, in addition, the internal circumference length of the passage 7 may be made to be the desired size shorter than the external circumference length of the corrugated tube D.

In the latter method, deformation of the sectional shape may be carried out simultaneously with reduction of the external circumference length, or after the deformation is completed, the reduction of the external circumference length may be separately carried out. According to this method, since the corrugated metal tube D is work-hardened by compression, a special wave guide can be produced which has a corrugation small in pitch and having little difference between curvatures of its top and bottom and, in addition, has remarkable rigidity for tension and bending in spite of the fact that the change of the sectional shape during bending is reduced.

Figure 10:
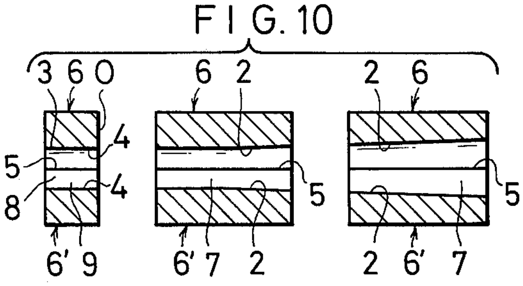
FIG. 10 is a longitudinally sectional side view of another embodiment of the apparatus of the present invention.
Figure 11A:
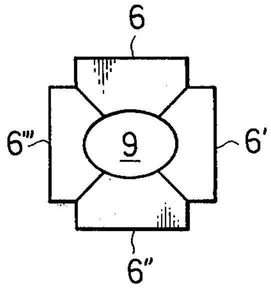
FIGS. 11(*a*) and 11(*b*) are end views of still another embodiment of the apparatus of the present invention having another types of sub-blocks.
Figure 11B:
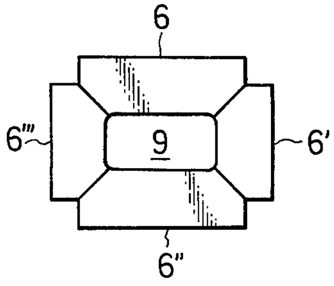
Figure 12A:
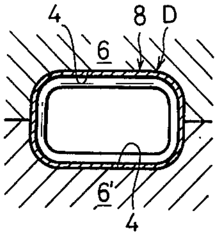
FIG. 12*a* to 12*c* are lateral sectional views of various passages of the apparatus.
Figure 12B:
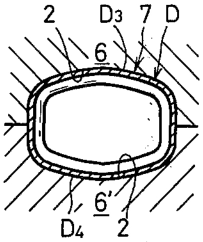
Figure 12C:
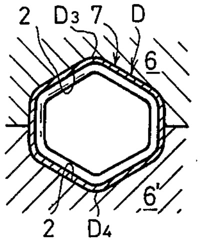
Figure 12D:
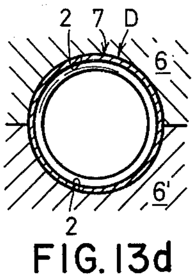
Figure 13A:
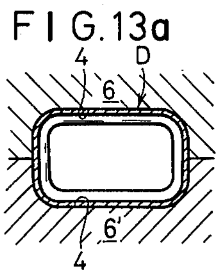
FIG. 13*a* to 13*c* are lateral sectional views of various passages of another type of the apparatus.
Figure 13B:
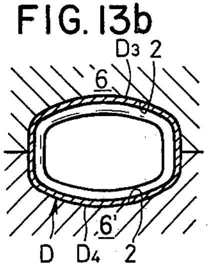
Figure 13C:
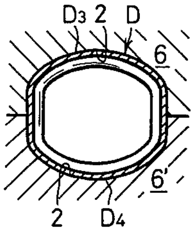
Figure 13D:
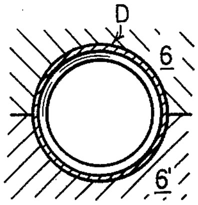

In the above-mentioned embodiments, the sub-blocks are shown as a pair. However, the number of the sub-blocks is not limited to two. As shown in FIG. 10, the sub-blocks 6 and 6' havina a predetermined length may be divided vertically to the axis of the passage 9 into a portion with the uniform recesses 4 and two portions with tapered recesses 2. As shown in FIG. 11, four wedge-shaped sub-blocks 6, 6', 6'' and 6''' may be used for forming the passage 9.

Figure 22A:
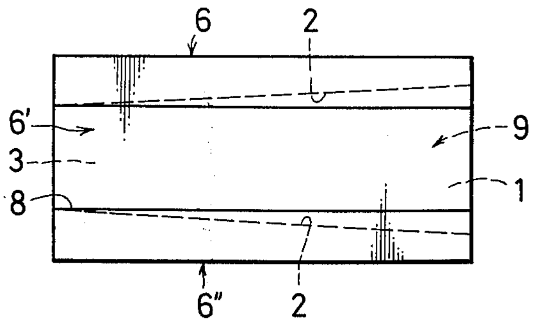
FIGS. 22(*a*) to 22(*c*) are views of still another type of apparatus of the present invention.
Figure 22B:
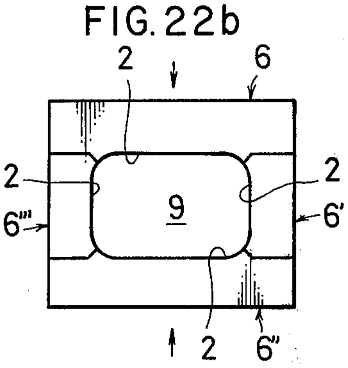
Figure 22C:
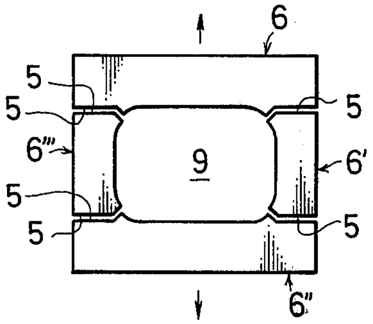
Figure 23A:
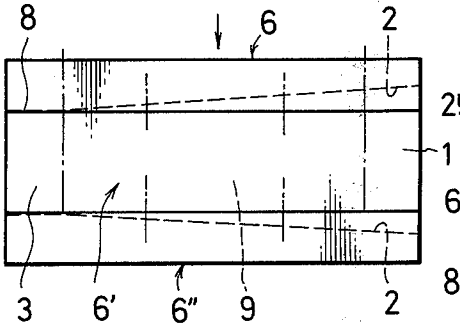
FIGS. 23(*a*) to 23(*d*) are views of still another embodiment of the apparatus of the present invention, and FIG. 23(*a*) is a side view, FIG. 23(*b*) is a plane view, FIG. 23(*c*) is an end view of the apparatus in the state cut along the line C—C—C'—C', FIG. 23(*d*) is end view of FIG. 23(*a*)
Figure 23B:
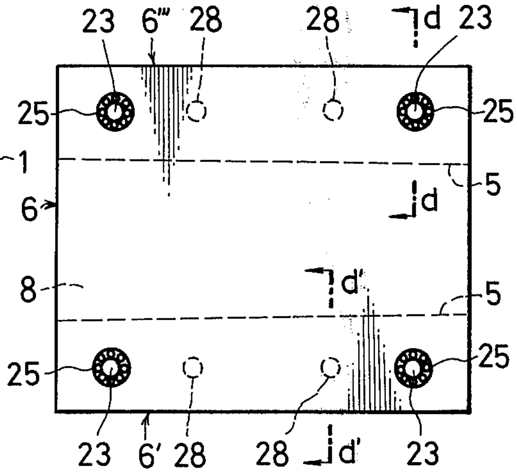
Figure 23C:
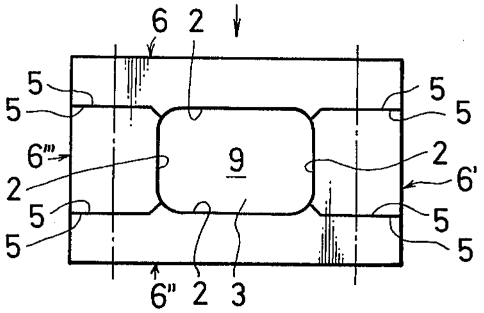
Figure 23D:
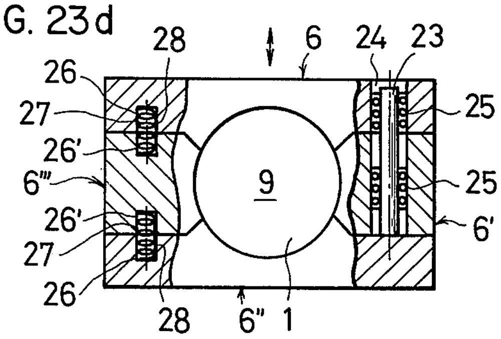

FIGS. 22 and 23 show the example in which only two sub-blocks are made movable from among four sub-blocks. In this example, the pressing sub-blocks 6 and 6'' with recesses 2 are separated vertically by a predetermined distance and the supporting sub-blocks 6' and 6''' with recesses 2 are disposed apart from each other by a predetermined distance between the pressing sub-blocks 6 and 6''. Thus the sub-blocks 6, 6', 6'' and 6''' form the passage 9 through the recesses 2.

As shown in FIG. 22(*b*) and 22(*c*), the sub-blocks 6, 6', 6'' and 6''' are adpated to periodically reciprocate between the state where the mating surfaces 5 thereof abut against each other and the state where the mating surfaces 5 thereof are apart from each other.

In this example, the recesses 2 of the sub-blocks are arcuately curved so that the inlet 1 of the passage 9 may turn into a circular shape whose diameter is slightly larger than the outer diameter of the corrugated metal tube D, and are somewhat flattened at the outlet side so that the outlet 3 of the passage 9 be of rectangular shape in cross-section as desired for the corrugated wave guide to be formed.

In the example shown in FIG. 23, the lower pressing sub-block 6'' is provided with guide rods 23 erected at the four corners of the upper surface thereof. These guide rods 23 are inserted through sliding pair rings 25 into holes 24 provided on the support sub-blocks 6 and 6'' and the upper prssing sub-block 6. Upper and lower spring-accomodating portions 27 formed by recesses 26 of the pressing sub-blocks 6 and 6'' and recesses 26' of the support sub-blocks 6' and 6''' accomodate coil springs 28 for upwardly urging the upper sub-block 6 and downwardly urging the lower sub-block 6'', thereby normally maintaining the upper and lower pressing sub-blocks 6 and 6'' apart from the support sub-blocks 6' and 6'''. Thus, if the lower pressing sub-block 6'' is mounted on the bolster of a general-purpose press to periodically press the upper pressing sub-block 6, the upper sub-block 6 and the support sub-blocks 6' and 6''' will reciprocate in the direction of arrows shown along the guide rods 23 and, simultaneously, the coil springs 28 will at all times maintain the support sub-blocks 6' and 6''' between the sub-blocks 6 and 6'' relatively thereto.

If a high speed press or the like is used to decrease the period of the separating and abutting operations, the distance of advance of the corrugated metal tube D per period may be made less than one pitch of the corrugation. Therefore, it is not necessary to make the length of the uniform passage 8 as long as *l* shown in FIG. 7. Thus, the masses of the sub-blocks 6, 6', 6'' and 6''' can be decreased and, therefore, a forming device suitable for high speed operation.

Figure 14A:
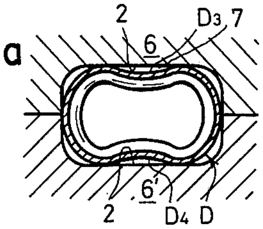
FIG. 14*a* and 14*b* are lateral sectional views of the passage forming on the way of operation of the apparatus.
Figure 14B:
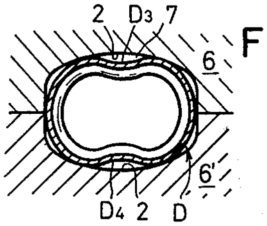
Figure 15A:
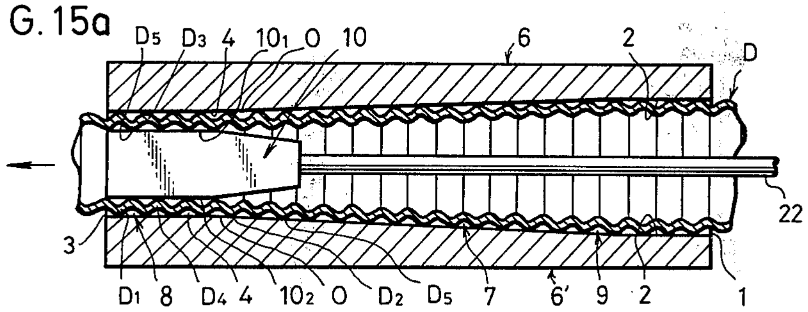
FIG. 15 (*a*) is a longitudinal sectional side view of the apparatus of the present invention using a core in the passage thereof when the sub-blocks are mated, FIG. 15(*b*) is a side end view of the apparatus, FIG. 15(*c*) is a lateral sectional plane view of the apparatus.
Figure 15B:
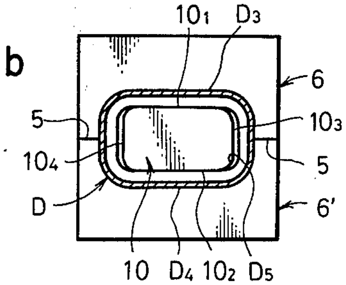
Figure 15C:
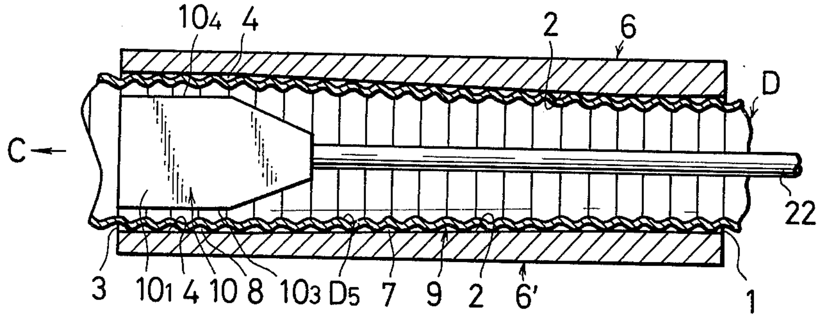
Figure 16A:
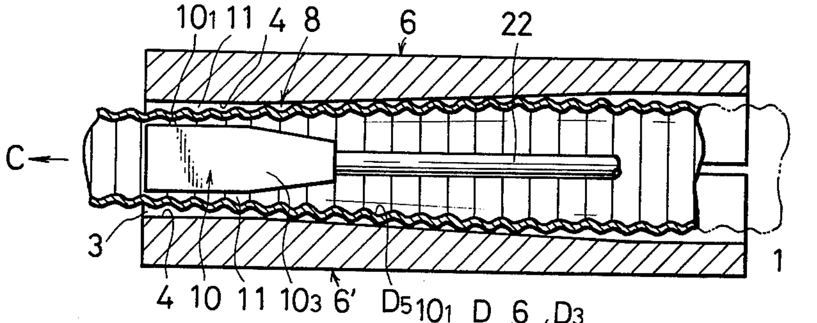
FIG. 16(*a*) is a longitudinal sectional view of the apparatus shown in FIG. 15 but when the sub-blocks are separated FIG. 16(*b*) is a side end view of the apparatus, and FIG. 16(*c*) is a lateral sectional plane view of the apparatus.
Figure 16B:
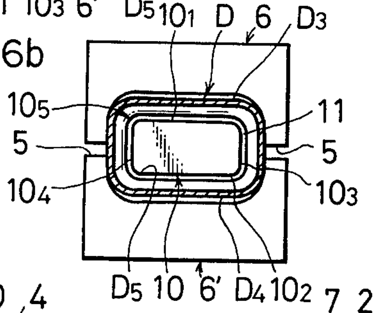
Figure 16C:
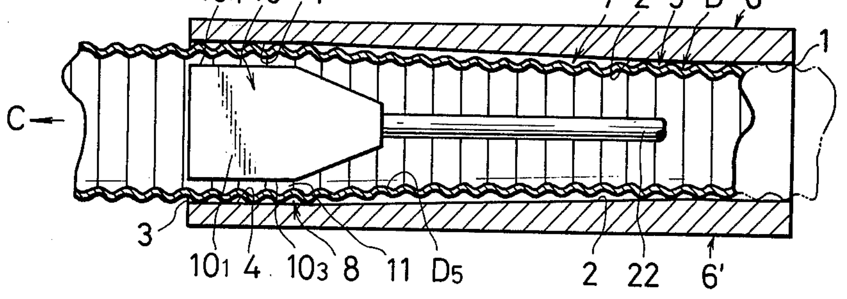

In cases where the corrugated wave guide is of rectangular cross-section, the uniform passage 8 is made rectangular in section as desired in the forming, and the tapered passage 7 is made so that it may have a hexagonal shape in section (FIG. 12) or a beer-barrel shape in section (FIG. 13) and, in addition, this sectional shape is gradually flattened as it nears the uniform passage 3. Thus, in the separating and mating operation of the sub-blocks 6 and 6', the upper and lower longitudinal surfaces $D_3$ and $D_4$ of the corrugated metal tube D can be pressed externally so that upper and lower longitudinal surfaces of the metal tube D may not collapse internally when deformed, as shown in FIG. 14, of the material, height of corrugation, selection of pitch, etc. Moreover, in order to prevent such collapse, a core 10 may be inserted in the uniform passage 8 of the metal tube D when the tube D is deformed, as shown in FIGS. 15 and 16. Generally, the electric characteristics of the rectangular wave guide depend upon the accuracy of the upper and lower surfaces $D_3$ and $D_4$. Therefore, the core 10 is made into a rectangular sectional shape corresponding to the desired rectangular finished shape and, in addition, the width of the core 10 is made slightly shorter than that of the desired rectangular forming shape so that, when the sub-blocks 6 and 6' are mated, the upper and lower surfaces $10_1$ and $10_2$ may abut against the internal circumference $D_5$ of the metal tube D, but, shorter surfaces $10_3$ and $10_4$ may be slightly apart from the internal circumference $D_5$, as shown in FIG. 15. In this way, the upper and lower longitudinal surfaces $D_3$ and $D_4$ are improved at least in in accuracy thereby obtaining a corrugated metal tube D superior in electric characteristics. When such metal tube D recovers its original shape due to elasticity, a clearance 11 is created between the internal circumference $D_5$ of the metal tube D and the external surface $10_5$ of the core 10 thereby facilitating the advance of the metal tube D in the direction of the arrow C, as shown in FIG. 16.

Figure 24A:
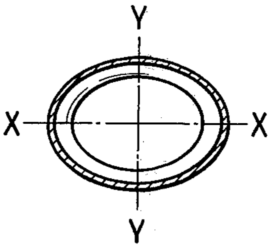
FIGS. 24(*a*) and 25(*a*) are longitudinally sectional front views of the waveguides of the present invention, and FIGS. 24(*b*) and 25(*b*) are side views of the waveguides shown in FIGS. 24(*a*) and 24(*b*)
Figure 24B:
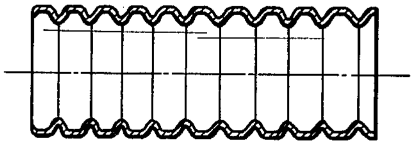
Figure 25A:
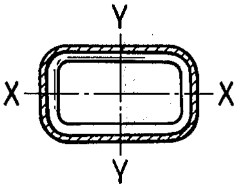
Figure 25B:
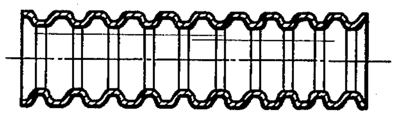
Figure 26A:
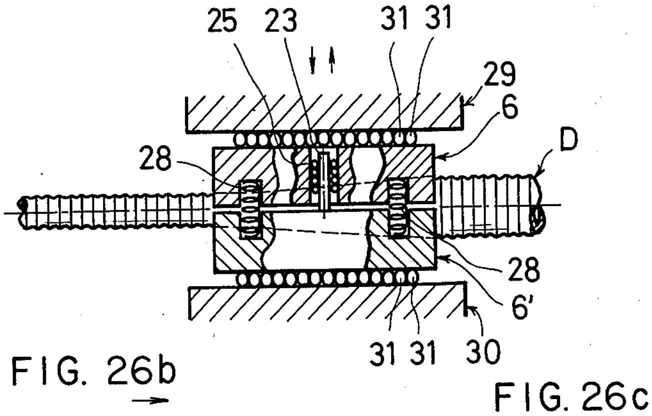
FIGS. 26 and 27 show another embodiment of the apparatus of the present invention.
Figure 26B:
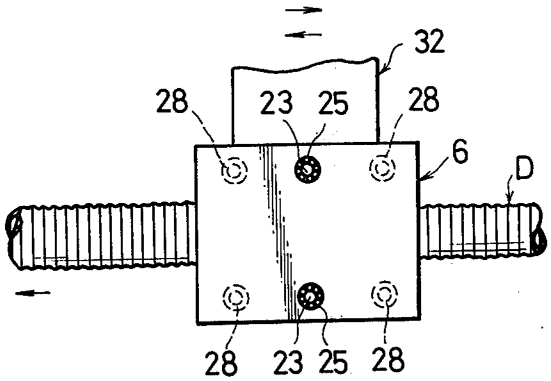
Figure 26C:
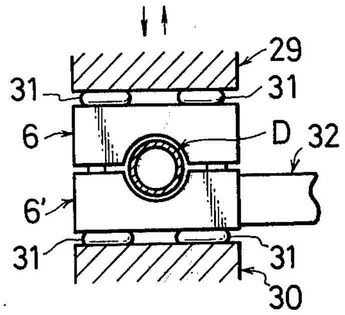

As shown in FIG. 15, each clearance between the the internal wall of the uniform passage 8 and the upper and lower surfaces $10_1$ and $10_2$ may be made less than the corrugation height of the corrugated metal tube D. Thus, when the sub-blocks 6 and 6' are mated to form the uniform passage 8, the passage 8 can finish the inserted portion of the corrugated metal tube D into the desired sectional shape and, in addition, can flatten the predetermined positions of the corrugation ends of the inserted portion of the metal tube D as shown in FIGS. 24 and 26. In FIGS. 24 and 25, the corrugation of the corrugated metal tube is uniformly shaped throughout the entire length and, therefore, a corrugated flexible wave guide of excellent electric characteristics can be obtained.

Figure 17A:
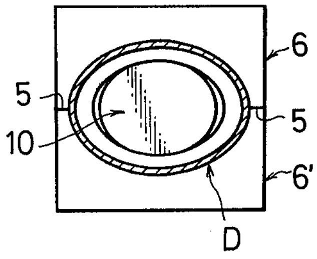
FIGS. 17(*a*) and 17(*b*) are side end views of another type of the apparatus using core.
Figure 17B:
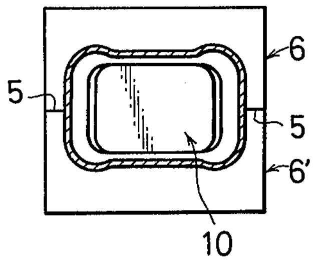

A clearance between the shorter side surfaces $10_3$ and $10_4$ of the core 10 and the internal surface of the metal tube is not necessarily required. The core 10 is useful not only for producing a rectangular wave guide, but also for producing wave guides with other sectional shapes by the application thereof corresponding to the desired forming shape, as shown in FIG. 17.

In order to actually use the aforementioned apparatus a, generally circular corrugated metal tube D is inserted into the passage 9, and at the same time the metal tube D is not pulled out to advance every time, but the tension force is preferably always applied in the direction of the arrow C so that the corrugated metal tube D is advanced by the tension force when the sub-blocks 6 and 6' are separated, and the mating surfaces 5 and 5 of the sub-blocks 6 and 6' opposing each other are in contact with each other by reciprocatingly moving one or both of the sub-blocks 6 and 6' by a predetermined constant period T, and then separating them.

Figure 18:
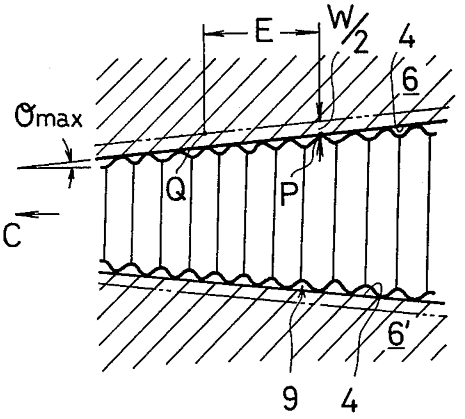
FIG. 18 is a partly enlarged longitudinally sectional view of the apparatus showing a generally circular corrugated metal tube inserted into the tapered passage of the apparatus.

Thus, as shown by a solid line in FIG. 18, when the sub-blocks 6 and 6' are put into contact, the corrugated metal tube D is depressed by the shape of the tapered recesses 4 and 4' of the passage 9 and is stopped, but as shown by a broken line in FIG. 18, when the sub-blocks 6 and 6' are separated, since the recesses 4 and 4' are separated from each other and from the metal tube D, the metal tube D is advanced in a direction of arrow C by the tension force always applied thereto, and also at this time a point P of the metal tube D upon contacting by the sub-blocks is advanced to the point Q contacting with the tapered recesses 4 and 4' which are separated, and is stopped there at a point, which is the length of advancing stroke E.

Therefore, if this contacting and separating are periodically repeated, the corrugated metal tube D is depressed gradually in the tapered passage 7 to be approximately the desired shape such as elliptic or rectangular shape, and is finally finished in the desired shape at the portion reached in the uniform passage 8, and at this time if the length $l$ of the passage 8 is equal to or longer than the length E of the advancing stroke, the finished portion of the metal tube D is merely guided out intermittently, but any unfinished portion may not be guided out at all.

If the material of the metal tube D has plenty of plasticity, the advancing speed V of the metal tube D guided out is generally a ratio of the length of the advancing stroke of the metal tube D at one contact and separation of the sub-blocks 6 and 6′ to the period T of the sub-blocks 6 and 6′ at one contact and separation repeatedly, that is $V=E/T$ (1) wherein $T=1/f$ (wherein $f$ represents vibrating frequency of the sub-blocks 6 and 6′), as clear from FIG. 18, $$E=\frac{\frac{w}{2}}{\tan\theta\max}$$

wherein $w$ is a width of separation of the sub-blocks 6 and 6′, $\theta$max is taper maximum angle of the tapered passage 7 as shown in FIG. 18, and from this formula and the formula (1), $$V=\frac{fw}{2\tan\theta\max} \qquad (2)$$

Figure 19:
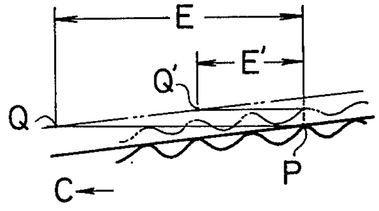
FIG. 19 is an explanatory view of the part shown in FIG. 18.
Figure 20:
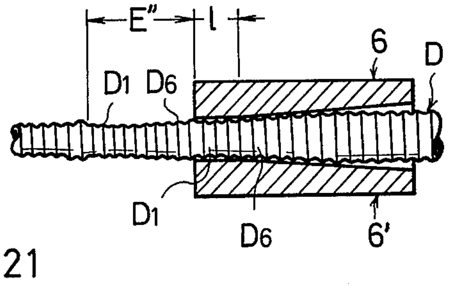
FIG. 20 is a longitudinally sectional side view of an example of improper use of the apparatus.

Here, the characteristics of spring back takes place in the metal tube, and accordingly since the corrugated metal tube D on contacting the sub-blocks 6 and 6′ springs back to the position shown by a dotted line in FIG. 19 when the sub-blocks 6 and 6′ are separated, the metal tube D pulled in a direction of arrow C by the tension force does not move to the point Q, but is stopped at the point Q′ so that the actual distance the metal tube D advances becomes E′ with the result that it becomes smaller than the theoretical length of the advancing stroke E, and yet the larger the spring back is, the smaller the advancing distance E′ becomes. From the formula (2), as both or one of the vibrating frequency $f$ of the sub-blocks 6 and 6′ and the width of separation of the sub-blocks 6 and 6′ $w$ becomes large, or the smaller the tapered maximum angle $\theta$max of the tapered passage 7 becomes, the advancing speed V becomes larger, and yet the frequency $f$ has is limited by the device for imparting the vibration to the sub-blocks 6 and 6′, but if it is provided as high as possible, not only the advancing speed V but the uniformity of the metal tube D in the longitudinal direction become preferable so as to improve the electric characteristics of the metal tube D. However, if the width $w$ is unnecessarily large or the maximum angle $\theta$max is made unnecessarily smaller, as shown in FIG. 20, as shown in FIG. 20, improper length of advancing stroke E′ becomes longer than the length $l$ of the uniform passage 8 with the result that, as shown in FIG. 20, not only the portion D1 finished deformed instead of in the desired shape in the passage 8 but the portion D6 formed in the tapered passage 7 pass out of the uniform passage 8 to be fed out of the outlet 3 so that the finished product becomes irregular in shape, and accordingly it is preferable that the width w and maximum angle $\theta$max be properly determined with respect to the relation of the length $l$ of the passage 8.

Figure 21:
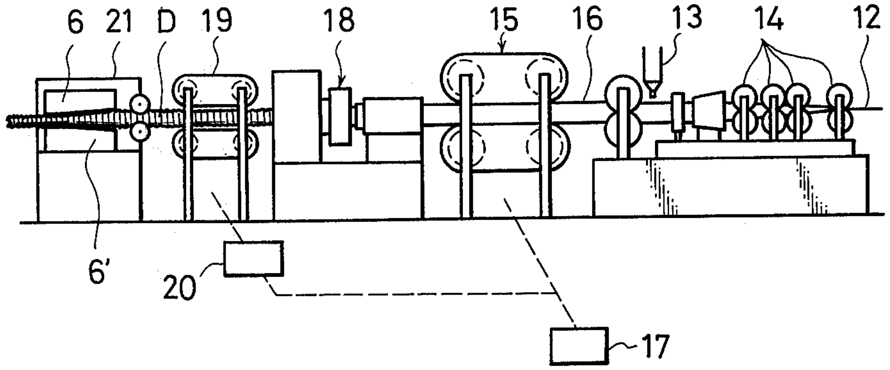
FIG. 21 is an explanatory view of the side of the entire apparatus of the corrugated waveguide using the apparatus.

FIG. 21 shows one example wherein the apparatus of the present invention is longitudinally arranged like a tube mill with a welding corrugating apparatus, and numeral 12 illustrates an elongated strip metal sheet having good electric conductivity such as copper, aluminum known as good conductors, 13 a welding station for welding the connecting portions of the metal sheet 12 curved by the tube forming rolls 14 at the forming stage, a pulling device 15 for pulling the formed metal tube 16 welded at the forming stage, a prime mover 17 for driving the device, a corrugating device 18 for corrugating the metal tube 16, a constant speed device 19 driven by the prime mover 17 through a transmission 20 for pulling the corrugated metal tube D at a predetermined speed ratio with respect to the pulling device 15 to absorb the vibration transmitted from the forming device 21 having the sub-blocks 6 and 6′ of the present invention provided at the latter stage to the metal tube 16 as to smoothly corrugate the metal tube. When the core 10 is used, a supporting bar 22 is passed through the metal tube 16, and when the metal tube 16 and the strip sheet 12 are curved by the forming device 14, the free end of the bar 22 projects externally from the opening in advance of the welding station as is conventional in tube welding and can making equipment.

In another embodiment the inserted corrugated metal tube D is pressed and deformed and the sub-blocks mated for pressing the metal tube D are advanced at the same speed as that of the sub-blocks in the advancing direction of the metal tube D, and then when the metal tube is advanced by a predetermined distance, the sub-blocks are separated so as to release the pressing force and simultaneously are returned to the original position before advanced, and this pressing operation to deform the metal tube, advancing and returning is repeated and thus the vibration imparted to the metal tube is reduced. As shown in FIG. 26, the sub-blocks 6 and 6′ are disposed between a reciprocatingly movable station 29 which moves up and back as shown by the arrow by reciprocating means along a stationary travel path 30 through needle rolls 31, 31,... guide rod 23 having the same function as shown and hereinbefore described with reference to FIG. 23, slide bearing 25, coil spring 28, etc., and advancing mover 32 for reciprocatingly moving the corrugated metal tube D, provided on the lower sub-block 6′ such as a device for feeding material when the press is moving upwardly and for stopping it when the press is moving downwardly to apply pressure thereto.

Therefore, when the movable station 29 is moved downwardly so that the upper sub-block 6 is pressed in FIG. 26, the corrugated metal tube D is pressed and deformed, and at this time the sub-blocks 6 and 6′ are advanced at the same speed as that of the metal tube D in the advancing direction of the metal tube D by the advancing mover 32, and accordingly the metal tube D is advanced without stopping, and therefore even if the metal tube is led during the stroke as shown in FIG. 22, the metal tube D is not vibrated as before, and further since the pressing of the upper sub-block 6 by the movable station 29 when the sub-blocks 6 and 6′ are advanced to the predetermined position is released, the sub-block 6 is pressed upwardly by the coil spring 28 so as to be separated therefrom, and at this time the sub-blocks 6 and 6′ are returned to their original position before advanced by the advancing mover 32, and the upper sub-block 6 is pressed again by the movable station 29 as before being so as to press and deform the portion of the corrugated metal tube D to be deformed so as to repeatedly press to deform, advance, separate and return and press to deform the metal tube periodically.

Figure 27:
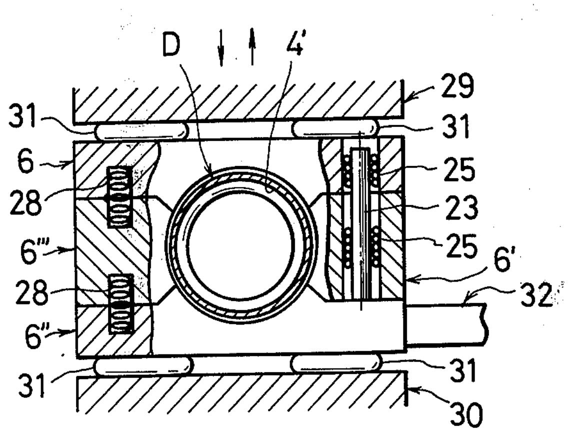

The apparatus shown in FIG. 27 also operates similarly to the above, and further has sub-blocks at the side, and accordingly the side of the metal tube D is not strained by the pressing and deforming from the upside and downside so as to obtain a preferable corrugated waveguide of good characteristics.

It should be understood from the foregoing description that the method of the present invention comprises inserting a generally circular corrugated metal tube D between partially tapered and partially uniform sub-blocks 6 and 6′ from the inlet 1, mating the sub-blocks 6 and 6′ to press and deform the inserted portion of the metal tube D by the tapered passage 7 formed by the pair of the tapered recesses 2 and 2 of the sub-blocks 6 and 6′, then separating the sub-blocks 6 and 6′ and advancing the metal tube D by a predetermined advancing stroke E toward the outlet 3, this mating of the sub-blocks 6 and 6′, separating and advancing of the metal tube D is then repeated so as to approximate the metal tube D to the desired shape such as rectangular or elliptic shape intermittently through the tapered passage 7 formed by the tapered recesses of the sub-blocks 6 and 6′, the metal tube is then further formed by the advance of the metal tube into the uniform passage 8 formed by the uniform recesses 4 and 4 of the sub-blocks 6 and 6′ upon mating of the sub-blocks and guiding out the deformed portion of the metal tube D from the passage 8 and at the same time the length of advancing stroke E is selected to be equal to or less than the length $l$ of the uniform passage 8, the outer diameter of the corrugated metal tube thus formed is superior in uniformity to the conventional metal tube formed by the conventional apparatus having caterpillars $i$ and $i'$, several rollers of different diameters and curvature, and yet since $E \leqq l$ is provided, this uniformity is still obtained even by the intermittent operation so that there exists no intermittent or periodical strain on the surface of the waveguide so as to eliminate the conventional disadvantages.

It should also be understood that since the apparatus of the present invention comprises sub-blocks 6 and 6′ each having a tapered recess 2 and 2 semi-circular in section at the inlet 1 side, uniform recess 4 and 4 semi-circular in section at the outlet 3 side and mating surfaces 5, 5,...longitudinally provided, so disposed that the mating surfaces 5, 5,... may periodically be mated, and separated, the tapered recesses 2 and 2 forming a tapered passage 7 upon mating thereof so that the predetermined shape of section such as elliptic section or rectangular section of the corrugated tube may be gradually formed, the uniform recesses 4 and 4 forming a uniform passage 8 upon mating thereof to form the passage 9 of the sub-blocks 6 and 6′, if the tension force toward the outlet 3 is always or timely applied to the corrugated metal tube D inserted into the passage 9 of the sub-blocks 6 and 6′, the corrugated metal tube D is gradually shaped to the desired shape such as a rectangular or elliptic shape by the pressing and deforming operation of the tapered passage 7 of sub-blocks 6 and 6′ upon mating, and the metal tube D is guided out toward the outlet 3 by a predetermined distance upon separating, and thus the portion of the metal tube D advanced into the uniform passage 8 is finished in the desired shape in the passage 8, and further only the portion D1 formed in the desired shape is fed out from the outlet 3, and thus of the metal tube is uniformly pressed and deformed over its entire length so as to obtain good characteristics of corrugated metal tube.

It should also be understood that since the sub-blocks 6 and 6′ may be divided into a number at the mating surfaces 5,5,... as shown in FIGS. 10 and 11 which are compact, preferably the sub-blocks are changed according to the size of the waveguide to be deformed.

It should also be understood that since the corrugated metal tube D may not be strained inside as shown in FIG. 14 if a core 10 is used as shown in FIGS. 15 and 16, a corrugated metal tube of more accuracy may be provided, and yet since the metal tube D is advance when the sub-blocks 6 and 6′ are separated, the advancing of the metal tube D is not disturbed due to the insertion of the core 10.

We claim:

1. A method of forming a corrugated waveguide of longitudinal uniformity from corrugated tubing of circular cross-section comprising the steps of:

a. using in a first work zone, opposed first forming blocks, outwardly tapered in elongation within the block interior, said blocks having a desired cross-sectional configuration, and applying said blocks to a first length of tubing at one end of said tubing so as to form said tubing approximately in the desired cross-sectional shape, removing said blocks from said first length of the tubing, advancing the first lengths of tubing to which said first blocks have been applied, by a predetermined stroke, applying said blocks to a second length adjacent to said first length and continuing said operation with third, fourth and nth lengths of tubing;

b. simultaneously using in a second work zone second forming blocks, uniform in interior cross-section of predetermined length and of said desired cross-section and applying them to said first, second, third, fourth and nth lengths of said tubing, as said tubing which has been advanced by said predetermined stroke leaves said first work zone, said predetermined stroke corresponding to a length no greater than the said predetermined interior length of said second blocks, so as to finish form said tubing in the desired shape; and, c. guiding out the finished tubing of desired cross-sectional configuration.

2. A method as claimed in claim 1 wherein the first blocks are advanced at the same speed as the tubing in the advancing direction of the tubing upon deformation of the first length of tubing by the first blocks, separating the opposing blocks and returning said blocks to their original position before the tubing is further advanced.

3. A method as claimed in claim 1 wherein on guiding out the finished tubing predetermined peripheral surfaces are flattened.

4. An apparatus for forming a corrugated waveguide comprising a plurality of pairs of blocks with inlet and outlet sides each having a tapered inner recess semicircular in cross-section at the inlet side thereof, a uniform recess of desired cross-section at the outlet side thereof and mating longitudinal surfaces, so disposed that the mating surfaces thereof may periodically be mated and separated, said tapered recesses thereof forming a tapered passage upon mating thereof so that a predetermined cross-sectional shape as desired of the corrugated tube may be gradually approximated, said uniform recesses thereof forming a uniform passage upon mating thereof of said desired shape.

5. An apparatus for forming a corrugated waveguide as claimed in claim 4, wherein the tapered passage formed by the tapered recesses of opposing blocks is so formed that the internal circumference thereof may have the same length as that of the corresponding outer circumference of the corrugated metal tubing at any section from the inlet thereof to the outlet thereof to finally form a predetermined shape in section of the metal tubing.

6. A tube mill for making a corrugated waveguide of uniform longitudinal configuration and of predetermined cross-section comprising in combination:

a. an elongated work table;

b. first forming squeeze rollers (14) longitudinally disposed at one end of said elongated work table for receiving an elongated flat strip (12) and gradually forming said strip (12) into a circular tube at a weld point;

c. welding means (13) disposed on said work table past said squeeze rollers (14) for welding the longitudinal edges of the metal strip (12) formed in tubular shape by the squeeze rollers (14);

d. pulling means (15) for pulling the formed tube (16) on said work table past said welding means (13);

e. a corrugating device (18) on said work table past said pulling means to corrugate said formed tube (16); and, f. the apparatus as claimed in claim 10, on said work table past said corrugating device (18).

7. An apparatus for forming a corrugated waveguide comprising a plurality of pairs of pressing blocks each having a tapered recess formed of a predetermined cross-sectional shape from the inlet toward the outlet so that a desired corss-sectional shape of the corrugated metal tubing may be gradually approximated and mating surfaces longitudinally provided, and a plurality pairs of supporting sub-blocks each having a tapered recess formed of a predetermined cross-sectional shape from the inlet toward the outlet, so disposed between pairs of pressing sub-blocks that the mating surfaces thereof may periodically be mated and separated movably to form a tapered passage upon mating thereof.

8. An apparatus as claimed in claim 4 including block advancing means and separating means for separating the pairs of the blocks by a predetermined distance and advancing the corrugated metal tube toward the outlet side thereof by a predetermined stroke so that the advance stroke of the corrugated tube is selected to be equal to or less than the length of the passage.

* * * * *